United States Patent
Kuno et al.

(10) Patent No.: US 11,143,072 B2
(45) Date of Patent: Oct. 12, 2021

(54) EXHAUST GAS PURIFICATION CATALYST AND EXHAUST GAS PURIFICATION METHOD USING THE SAME

(71) Applicant: UMICORE SHOKUBAI JAPAN CO., LTD., Tokoname (JP)

(72) Inventors: Hirotaka Kuno, Himeji (JP); Masashi Nakashima, Himeji (JP); Kenji Ashikari, Himeji (JP); Yuji Ogino, Himeji (JP); Kazuyoshi Komata, Himeji (JP); Shigekazu Minami, Himeji (JP)

(73) Assignee: UMICORE SHOKUBAI JAPAN CO., LTD., Tokoname (JP)

( * ) Notice: Subject to any disclaimer, the term of this patent is extended or adjusted under 35 U.S.C. 154(b) by 97 days.

(21) Appl. No.: 16/607,392

(22) PCT Filed: Apr. 26, 2018

(86) PCT No.: PCT/JP2018/017023
§ 371 (c)(1),
(2) Date: Oct. 23, 2019

(87) PCT Pub. No.: WO2018/199248
PCT Pub. Date: Nov. 1, 2018

(65) Prior Publication Data
US 2020/0049041 A1   Feb. 13, 2020

(30) Foreign Application Priority Data
Apr. 28, 2017   (JP) .............................. JP2017-090252

(51) Int. Cl.
*B01J 21/06*   (2006.01)
*B01J 23/10*   (2006.01)
(Continued)

(52) U.S. Cl.
CPC .............. *F01N 3/022* (2013.01); *B01J 23/44* (2013.01); *F01N 2370/02* (2013.01); *F01N 2510/0682* (2013.01)

(58) Field of Classification Search
CPC . B01J 21/066; B01J 23/10; B01J 23/44; B01J 23/464; B01J 23/63; F01N 3/022;
(Continued)

(56) References Cited

U.S. PATENT DOCUMENTS 4,868,148 A * 9/1989 Henk ........................ B01J 23/89
502/303
5,000,929 A * 3/1991 Horiuchi ................... B01J 23/63
423/213.5
(Continued)

FOREIGN PATENT DOCUMENTS

JP   H09-500570 A   1/1997
JP   2003-200049 A   7/2003
(Continued)

OTHER PUBLICATIONS

Extended European Search Report dated Dec. 16, 2020, by the European Patent Office in corresponding European Patent Application No. 18791565.7. (8 pages).
(Continued)

*Primary Examiner* — Cam N. Nguyen
(74) *Attorney, Agent, or Firm* — Buchanan Ingersoll & Rooney PC

(57) ABSTRACT

In order to provide an exhaust gas purification catalyst capable of purifying hydrocarbons, carbon monoxide, and nitrogen oxides in exhaust gas at low temperatures, the exhaust gas purification catalyst according to the present invention includes: a region (2) containing palladium on a three-dimensional structure (1), and a first region (3) and a second region (4) provided on the region (2) in order from
(Continued)

an inflow side of exhaust gas to an outflow side of exhaust gas. The concentration of neodymium contained in the first region (3) is higher than the concentration of neodymium contained in the second region (4).

17 Claims, 2 Drawing Sheets

(51) Int. Cl.
  *B01J 23/44*  (2006.01)
  *B01J 23/46*  (2006.01)
  *B01J 23/63*  (2006.01)
  *F01N 3/022*  (2006.01)
  *B01D 53/94*  (2006.01)

(58) Field of Classification Search
  CPC .............. B01D 53/94; F01B 2370/02; F01B 2510/0682
  See application file for complete search history.

(56) References Cited

U.S. PATENT DOCUMENTS

| | | | | |
|---|---|---|---|---|
| 5,019,546 | A * | 5/1991 | Murakami | B01J 35/04 502/303 |
| 5,071,816 | A * | 12/1991 | Horiuchi | B01D 53/944 502/302 |
| 5,248,650 | A * | 9/1993 | Sekiba | B01J 23/63 502/303 |
| 5,597,771 | A * | 1/1997 | Hu | F01N 3/101 502/304 |
| 5,948,723 | A * | 9/1999 | Sung | B01J 37/038 502/303 |
| 6,764,665 | B2 * | 7/2004 | Deeba | B01J 23/63 423/239.1 |
| 7,923,047 | B2 * | 4/2011 | Jensen | A23L 13/428 426/97 |
| 8,067,330 | B2 * | 11/2011 | Suzuki | F01N 3/0842 502/302 |
| 8,568,675 | B2 * | 10/2013 | Deeba | B01D 53/945 423/213.5 |
| 8,580,705 | B2 * | 11/2013 | Aoki | B01D 53/945 502/304 |
| 8,673,809 | B2 * | 3/2014 | Nakatsuji | B01J 21/066 502/327 |
| 8,853,120 | B2 * | 10/2014 | Aoki | B01J 35/0006 502/303 |
| 8,975,204 | B2 * | 3/2015 | Hori | B01J 23/63 502/304 |
| 9,174,198 | B2 * | 11/2015 | Kawabata | B01D 53/945 |
| 9,522,360 | B2 * | 12/2016 | Schmidt | B01D 53/945 |
| 9,561,494 | B2 * | 2/2017 | Kato | B01J 23/468 |
| 9,604,175 | B2 * | 3/2017 | Hatfield | B01J 35/04 |
| 9,643,161 | B2 * | 5/2017 | Chiffey | B01J 37/0246 |
| 9,987,618 | B2 * | 6/2018 | Chiffey | B01J 37/0244 |
| 10,773,209 | B2 * | 9/2020 | Liu | B01D 53/945 |
| 2003/0061860 | A1 | 4/2003 | Hu et al. | |
| 2003/0083193 | A1 | 5/2003 | Takaya et al. | |
| 2007/0014705 | A1 | 1/2007 | Chen | |
| 2008/0016857 | A1 | 1/2008 | Hu et al. | |
| 2009/0042722 | A1 | 2/2009 | Hu et al. | |
| 2013/0310248 | A1 * | 11/2013 | Aoki | B01J 37/0248 502/303 |
| 2014/0357480 | A1 | 12/2014 | Aoki | |
| 2016/0256854 | A1 | 9/2016 | Aoki | |

FOREIGN PATENT DOCUMENTS

| | | |
|---|---|---|
| JP | 2005-505403 A | 2/2005 |
| JP | 2009-061437 A | 3/2009 |
| JP | 2010-005590 A | 1/2010 |
| JP | 2010-264371 A | 11/2010 |
| JP | 2013-006179 A | 1/2013 |
| JP | 2013-136032 A | 7/2013 |
| JP | 2015-066516 A | 4/2015 |
| JP | 2015-073943 A | 4/2015 |
| JP | 2016-179451 A | 10/2016 |
| JP | 2017-006905 A | 1/2017 |
| WO | 2008/024708 A2 | 2/2008 |
| WO | 2015/052569 A1 | 4/2015 |

OTHER PUBLICATIONS

International Search Report dated Aug. 7, 2018, by the Japanese Patent Office in corresponding International Application No. PCT/JP2018/017023. (2 pages).

Notification of Transmittal of Translation of the International Preliminary Report on Patentability (Forms PCT/IB/338, PCT/IB/373 and PCT/ISA/237) dated Oct. 29, 2019, by the International Bureau of WIPO in corresponding International Application No. PCT/JP2018/017023. (14 pages).

* cited by examiner

EXHAUST GAS PURIFICATION CATALYST AND EXHAUST GAS PURIFICATION METHOD USING THE SAME

TECHNICAL FIELD

The present invention relates to an exhaust gas purification catalyst and an exhaust gas purification method using such an exhaust gas purification catalyst and more specifically relates to an exhaust gas purification catalyst capable of purifying hydrocarbons (HC), carbon monoxide (CO), and nitrogen oxides (NOx) in exhaust gas at low temperatures and an exhaust gas purification method using such an exhaust gas purification catalyst.

BACKGROUND OF THE INVENTION

Numerous exhaust gas purification methods have been proposed in which hydrocarbons (HC), carbon monoxide (CO), and nitrogen oxides (NOx) are removed simultaneously from exhaust gas.

For example, technology has been proposed in which a catalyst component is overlap-coated onto a catalyst support and the concentration of precious metals contained in this overlapping part is changed, thereby even when the poisoning components contained in exhaust gas adhere to the catalyst, a fixed amount of the catalytically active component is protected from the poisoning material, and thus a reduction in the activity of the catalyst due to the catalytically active component becoming poisoned does not occur (Patent Document 1). Furthermore, in order to improve the contact efficiency between the oxygen storage component contained in the catalyst and the exhaust gas, a technique for overlap-coating the catalyst has been proposed (Patent Document 2). Technology has also been proposed for the purpose of purifying HC and NOx in exhaust gas by overlap-coating the catalyst component in consideration of the activity of each of the precious metals of Pt, Pd, and Rh and by dividing the regions where the Pt and Pd, which are contained in sections directly coated onto the support, are present (Patent Document 3).

However, exhaust gas regulations are becoming increasingly strict with the passage of time, and known exhaust gas purification catalysts cannot sufficiently satisfy the stricter regulations. In particular, currently, the performance of rhodium, which is effective in reducing NOx, cannot be fully utilized. For example, when exhaust gas contacts the catalyst, the concentrations of oxygen and components to be purified such as NOx are changed, thereby the purification (treatment) amount of components to be purified varies from the exhaust gas inlet side to the outlet side, and thus it is difficult to sufficiently clean the exhaust gas. More specifically, for example, when an automobile transitions from an idling state to a traveling state, a large amount of high-temperature exhaust gas is instantaneously produced and is introduced into the exhaust gas purification catalyst. However, the temperature of the exhaust gas purification catalyst is lower than that of the exhaust gas. Therefore, it is difficult to immediately purify exhaust gas with known exhaust gas purification catalysts. That is, known exhaust gas purification catalysts have low catalytic responsiveness to exhaust gas.

CITATION LIST

Patent Literature

Patent Document 1: JP 2013-6179 A
Patent Document 2: JP 2005-505403 A
Patent Document 3: JP 2010-5590 A

SUMMARY OF THE INVENTION

Technical Problem

The technologies disclosed in Patent Documents 1 to 3 are limited to merely purifying the HC and NOx in exhaust gas and are not sufficient for application when the temperature of the exhaust gas is low.

The present invention was conceived in view of the problems described above, and an object of the present invention is to provide an exhaust gas purification catalyst capable of efficiently purifying HC, CO, and NOx in exhaust gas discharged at low temperatures at which it is difficult for the catalyst to act sufficiently and to provide an exhaust gas purification method using such an exhaust gas purification catalyst. The exhaust gas purification catalyst and the exhaust gas purification method using such an exhaust gas purification catalyst according to the present invention can purify NOx at low temperatures. In particular, an object of the present invention is to provide a purification catalyst with excellent responsiveness and an exhaust gas purification method using such an exhaust gas purification catalyst, which are capable of treating large amounts of high-temperature exhaust gas even when conditions change from a state in which a small amount of low-temperature exhaust gas is being introduced to a state in which a large amount of high-temperature exhaust gas is instantaneously introduced, that is, not only when the temperature of the exhaust gas suddenly rises, but also when the space velocity with respect to the catalyst (capacity (h−1) per unit time of exhaust gas passing through a catalyst of a unit volume) has suddenly increased. Furthermore, the exhaust gas purification catalyst according to the present invention is a catalyst that exhibits durability and can purify NOx for a long period of time.

Solution to Problem

As a result of diligent research to solve the problems described above, the present inventors discovered the below-described exhaust gas purification catalyst and thereby arrived at the completion of the present invention.

That is, the exhaust gas purification catalyst according to the present invention includes: a region containing palladium, the region being provided on a three-dimensional structure; and a first region and a second region being provided on the region containing palladium in order from an inflow side exhaust gas to an outflow side of exhaust gas, and the concentration of neodymium contained in the first region is higher than the concentration of neodymium contained in the second region.

Advantageous Effects of Invention

According to the present invention, an exhaust gas purification catalyst capable of efficiently purifying hydrocarbons (HC), carbon monoxide (CO), and nitrogen oxides (NOx) in exhaust gas discharged at low temperatures at which it is difficult for the catalyst to act sufficiently and an exhaust gas purification method using such an exhaust gas purification catalyst can be provided.

DESCRIPTION OF EMBODIMENTS

Figure 1:
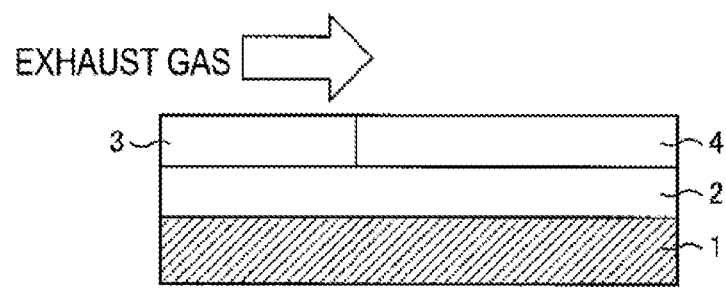
FIG. 1 is a cross section view illustrating a schematic configuration of an exhaust gas purification catalyst according to an embodiment (Example 1).

Embodiments of the present invention will be described in detail below. However, the present invention is not limited thereto, various modifications are possible within the scope described, and embodiments obtained by appropriately combining technical means disclosed in the different embodiments are also included in the technical scope of the present invention. Note that, unless otherwise indicated herein, "from A to B" representing a numerical range of "from A or more to B or less." Furthermore, when there are characteristics related to mass or physical properties with respect to each element, a separate formula, substance name, and the like will be given.

An exhaust gas purification catalyst (hereinafter simply referred to as "catalyst") according to an embodiment of the present invention includes: a region containing palladium, the region being provided on a three-dimensional structure; and a first region and a second region being provided on the region containing palladium in order from an inflow side of exhaust gas to an outflow side of exhaust gas, and the concentration of neodymium contained in the first region is the same or higher than the concentration of neodymium contained in the second region. Furthermore, (i) preferably, the concentration of neodymium contained in the first region is the same or higher than the concentration of neodymium contained in the second region; (ii) more preferably, the concentration of neodymium contained in the first region and the second region is the same or higher than the concentration of neodymium contained in the region containing palladium; (iii) more preferably, the first region and the second region contain a neodymium-containing zirconium oxide; and (iv) preferably, the first region and the second region contain multiple neodymium-containing zirconium oxides having a different content of neodymium. In addition, the exhaust gas purification method according to an embodiment of the present invention uses the exhaust gas purification catalyst to purify exhaust gas.

Three-Dimensional Structure

Although the three-dimensional structure used in an embodiment of the present invention is not particularly limited as long as the three-dimensional structure is a structure that can cover a catalyst on the surface thereof, the three-dimensional structure is preferably a structure having a shape that is normally used as a catalyst support such as a flow-through honeycomb, plug honeycomb, corrugated honeycomb, plate, or wave-plate, and a flow-through honeycomb shaped structure is more preferable. The material of the three-dimensional structure is not particularly limited as long as the material has heat resistance, and iron-based metals such as stainless steel; and ceramics such as cordierite, SiC, and alumina can be suitably used.

Three-dimensional structures are commercially available as three-dimensional structures for exhaust gas purification, and such structures can be used. A desirable size and shape of the three-dimensional structure can be appropriately selected according to the amount of exhaust gas to be treated.

The length of the three-dimensional structure is not greater than 200 mm, preferably not greater than 160 mm, more preferably not greater than 120 mm, and most preferably not greater than 100 mm and is not less than 30 mm, preferably not less than 50 mm, even more preferably not less than 60 mm, and most preferably not less than 70 mm.

An appropriate diameter of the cross-section of the three-dimensional structure is not less than 60 mm and preferably not less than 70 mm and is not greater than 120 mm and preferably not greater than 100 mm.

The volume of the three-dimensional structure is not less than 0.4 liters (hereinafter, may be referred to as "L"), preferably not less than 0.5 L, and more preferably not less than 0.6 L and is also not greater than 2.0 L, preferably not greater than 1.6 L, and even more preferably not greater than 1.4 L.

When the three-dimensional structure has holes, the shape of the holes may be any shape such as triangular, square, hexagonal, or circular, but a square or hexagonal shape is preferable. The number of holes is preferably from 15 holes/cm$^2$ to 190 holes/cm$^2$ and more preferably from 60 holes/cm$^2$ to 140 holes/cm$^2$.

Region Containing Palladium

A region containing palladium is provided on the three-dimensional structure. The region containing palladium need only contain at least palladium. The amount of palladium contained in the region is, in terms of metal, not less than 0.1 g/L (hereinafter, the amount of each component per liter of the three-dimensional structure may be described as "g/L"; the same applies to the claims), more preferably not less than 0.2 g/L, even more preferably not less than 0.4 g/L, and most preferably not less than 2 g/L relative to the three-dimensional structure. When the amount of palladium is less than 0.1 g/L, the reaction sites in the three-dimensional structure are insufficient. Moreover, the amount of palladium contained in the region is, in terms of metal, not greater than 20 g/L, more preferably not greater than 15 g/L, even more preferably not greater than 10 g/L, and most preferably not greater than 5 g/L relative to the three-dimensional structure. When the amount of palladium exceeds 20 g/L, the reaction efficiency decreases.

The concentration of palladium contained in the region containing palladium is preferably not less than 1 mass % and more preferably not less than 2 mass % and is preferably 10 not greater than mass % and more preferably not greater than 8 mass %. "Concentration" in the present specification is the percentage (%) of the mass of each component relative to the mass of the total of all components contained in the respective region. Hereinafter, descriptions relating to "concentration" are the same for each component in the other regions. Note that palladium, rhodium, and platinum are expressed in terms of metal, and other components are expressed in terms of oxide, respectively.

Platinum and rhodium may be contained in the region, as necessary, but the amounts of platinum and rhodium are preferably small in order to emphasize the effect of palladium.

Nitrates, chloride salts, and the like can be used as raw materials for palladium, platinum, and rhodium (collectively described as "precious metals"), and nitrates are more preferable.

The length of the region is preferably not less than 50%, more preferably not less than 60%, even more preferably not less than 70%, and most preferably not less than 80% and is preferably not greater than 85%, more preferably not greater than 90%, even more preferably not greater than 95%, and most preferably not greater than 100% of the length of the three-dimensional structure.

Examples of components other than the precious metals contained in the region include components that are ordinarily used in catalysts including alumina such as α-alumina, γ-alumina, and θ-alumina; silica, titania, zirconia, or mixtures thereof and refractory inorganic oxides such as complex oxides thereof; alkali metal oxides; Mg; alkaline earth metal oxides; oxides of rare earth metals such as La, Ce, and Nd; and transition metal oxides. Among the above exemplary components, alumina or zirconia, which is a refractory inorganic oxide, oxygen storage substances (for example, cerium oxide) that can store oxygen, or lanthanum that can improve fire resistance is more preferable. A commercially available oxide can be appropriately used as the oxide described above.

Among the rare earth elements, when cerium is used, an oxide of cerium can interact as an oxygen storage material with palladium to improve the NOx purification performance at low temperatures. The amount of cerium oxide contained in the region is, in terms of $CeO_2$, not less than 1 g/L and more preferably not less than 5 g/L relative to the three-dimensional structure. When the amount of cerium oxide is less than 1 g/L, the amount of oxygen storage is insufficient. Furthermore, the amount of cerium oxide is, in terms of $CeO_2$, not greater than 50 g/L and more preferably not greater than 30 g/L relative to the three-dimensional structure. When the amount of cerium oxide exceeds 50 g/L, the heat resistance of the region is insufficient. When lanthanum is used, the amount of lanthanum is, in terms of $La_2O_3$, not less than 1 g/L, preferably not less than 3 g/L, and more preferably not less than 8 g/L and is also not greater than 30 g/L and preferably not greater than 20 g/L relative to the three-dimensional structure. When neodymium is contained in the region containing palladium, the amount thereof is preferably smaller than the amount of neodymium contained in the first region or the second region.

The amount of the refractory inorganic oxide used in the region is not less than 5 g/L, more preferably not less than 30 g/L, and even more preferably not less than 50 g/L and is also not greater than 150 g/L, more preferably not greater than 120 g/L, and even more preferably not greater than 100 g/L relative to the three-dimensional structure. The amount of the alkaline earth metal oxide used in the region is not less than 1 g/L and more preferably not less than 5 g/L and is also not greater than 25 g/L and more preferably not greater than 15 g/L relative to the three-dimensional structure. The amount of the rare earth metal oxide, excluding cerium and lanthanum, used in the region is not less than 1 g/L and more preferably not less than 5 g/L and is also not greater than 25 g/L and more preferably not greater than 15 g/L relative to the three-dimensional structure. The amount of the transition metal oxide used in the region is not less than 1 g/L and more preferably not less than 5 g/L and is also not greater than 25 g/L and more preferably not greater than 15 g/L relative to the three-dimensional structure.

In particular, the amount of zirconium oxide used in the region is, in terms of $ZrO_2$, not less than 5 g/L and more preferably not less than 10 g/L, relative to the three-dimensional structure. When the amount of zirconium oxide is less than 5 g/L, the heat resistance of the region is insufficient. In addition, the amount of zirconium oxide is not greater than 50 g/L, more preferably not greater than 40 g/L, and even more preferably not greater than 30 g/L relative to the three-dimensional structure. When the amount of zirconium oxide exceeds 50 g/L, the concentration of the other components becomes diluted, which facilitates a reduction in the effect of the other components.

The amount of all components provided in the region containing palladium is not less than 10 g/L, preferably not less than 50 g/L, more preferably not less than 70 g/L, even more preferably not less than 90 g/L, and most preferably not less than 100 g/L and is also not greater than 220 g/L, more preferably not greater than 200 g/L, and even more preferably not greater than 150 g/L relative to 1 liter (L) of the three-dimensional structure.

First Region

The first region is provided on the region containing palladium at the inflow side of exhaust gas. The first region need only contain at least neodymium. The neodymium can suppress rhodium migration and aggregation, and thus it is effective to include rhodium in the region where neodymium is contained. Preferably, as the amount of rhodium that is contained is increased, the amount of neodymium is also increased. Furthermore, the amount of neodymium is, in terms of $Nd_2O_3$, not less than 0.1 g/L and more preferably not less than 2 g/L relative to the three-dimensional structure. When the amount of neodymium is less than 0.1 g/L, the effect of suppressing the migration of the precious metals, and particularly, the effect of suppressing the migration of rhodium is reduced, which is not preferable. Moreover, the amount of neodymium is, in terms of $Nd_2O_3$, not greater than 20 g/L, more preferably not greater than 10 g/L, even more preferably not greater than 9 g/L, and most preferably 7 g/L relative to the three-dimensional structure. When the amount of neodymium exceeds 20 g/L, it is difficult to obtain an effect of suppressing the migration of precious metals proportionate to the amount of added neodymium.

In addition to being used as an oxide, neodymium contained in the first region preferably forms a complex oxide with another metal. For example, a complex oxide (neodymium-containing complex oxide) formed of neodymium and zirconium, aluminum, titanium, or the like can be used, and preferably, a neodymium-containing zirconium oxide formed of neodymium and zirconium is used. More preferably, at least one of a neodymium-containing zirconium oxide (1) having a high neodymium content and a neodymium-containing zirconium oxide (2) having a low neodymium content is used, and most preferably, both the neodymium-containing zirconium oxide (1) and the neodymium-containing zirconium oxide (2) are used. The amount of neodymium (in terms of $Nd_2O_3$) contained in the neodymium-containing complex oxide (1) having a high neodymium content is not less than 15 mass % and preferably not less than 20 mass % and is also not greater than 40 mass % and preferably not greater than 30 mass %. On the other hand, the amount of neodymium (in terms of $Nd_2O_3$) contained in the neodymium-containing complex oxide (2) having a low neodymium content is not less than 1 mass % and preferably not less than 3 mass % and is also not greater than 10 mass % and preferably not greater than 7 mass %.

Examples of components other than neodymium contained in the first region include components that are ordinarily used in catalysts including alumina such as α-alumina, γ-alumina, and θ-alumina; silica, titania, zirconia, or mixtures thereof and refractory inorganic oxides such as complex oxides thereof; alkali metal oxides; alkaline earth metal oxides; rare earth metal oxides (excluding neodymium); and transition metal oxides. Among the above exemplary components, alumina or zirconia, which is a refractory inorganic oxide, oxygen storage substances (for example, cerium oxide) that can store oxygen, or lanthanum that can improve fire resistance is more preferable, and γ-alumina, θ-alumina, zirconia, and cerium oxide are even more preferable.

In particular, the amount of zirconium oxide used in the first region is not less than 2 g/L, more preferably not less than 3 g/L, and even more preferably not less than 5 g/L relative to the three-dimensional structure. When the amount of zirconium oxide is less than 2 g/L, the heat resistance of the first region is insufficient. Furthermore, the amount of zirconium oxide is not greater than 50 g/L and more preferably not greater than 30 g/L relative to the three-dimensional structure. When the amount of zirconium oxide exceeds 50 g/L, the concentration of the other components decreases, which reduces the effect of the other components.

The first region may further contain a precious metal such as platinum, palladium, and rhodium. Platinum and rhodium are more preferable as the precious metal, and rhodium is even more preferable. The amount of platinum or palladium used in the first region may be substantially 0 g/L, which is an amount such that platinum or palladium does not produce an effect depending on the state of the exhaust gas, and the amount of platinum or palladium may be respectively, in terms of metal, greater than 0 g/L, preferably not less than 0.01 g/L, more preferably not less than 0.02 g/L and is not greater than 12 g/L and more preferably not greater than 10 g/L relative to the three-dimensional structure depending on the state of the exhaust gas. The amount of rhodium used in the first region is, in terms of metal, not less than 0.05 g/L, more preferably not less than 0.1 g/L, and even more preferably not less than 0.12 g/L and is also not greater than 1.2 g/L, more preferably not greater than 1.0 g/L, and even more preferably not greater than 0.5 g/L relative to the three-dimensional structure.

The concentration of rhodium contained in the first region is not less than 0.2 mass % and preferably not less than 0.25 mass % and is also not greater than 0.5 mass % and preferably not greater than 0.4 mass %.

Moreover, the amount of palladium contained in the first region is not less than 0.1 g/L and preferably not less than 0.13 g/L and is also less than 1 g/L, preferably not greater than 0.7 g/L, and more preferably not greater than 0.5 g/L relative to the three-dimensional structure.

The concentration of palladium contained in the first region is not less than 0.2 mass % and preferably not less than 0.25 mass % and is also not greater than 0.5 mass % and preferably not greater than 0.4 mass %.

The amount of all components provided in the first region is not less than 21 g/L, preferably not less than 30 g/L, more preferably not less than 50 g/L and is also not greater than 120 g/L, preferably less than 100 g/L, more preferably less than 90 g/L, and even more preferably less than 70 g/L relative to 1 liter (L) of the three-dimensional structure.

Using the inflow side of exhaust gas as a starting point, the length of the first region is preferably not less than 20 mm, more preferably not less than 25 mm, and even more preferably not less than 30 mm. When the length of the first region is shorter than 20 mm, precious metal is not sufficiently present at the inflow side of exhaust gas, and thus the purification rate of the exhaust gas will be low. Furthermore, using the inflow side of exhaust gas as a starting point, the length of the first region is preferably not greater than 50 mm, more preferably not greater than 40 mm, and even more preferably not greater than 35 mm. When the length of the first region is longer than 50 mm, precious metal is not supported in a concentrated manner at the inflow side of exhaust gas, and thus the purification rate of the exhaust gas will be low.

Here, the length of each of the regions is an average value of "$(L_{min}+L_{max})\div 2$" of the shortest value $L_{min}$ and the longest value $L_{max}$ of the internal length of a region when the completed catalyst or the three-dimensional structure is divided where each of the regions are coated.

As an example of a method for confirming the coating state (coating length, coating thickness, and coating amount) of each of the below-described slurries on the three-dimensional structure, for a catalyst that was formed by applying each slurry under several coating conditions in advance, a method of breaking the catalyst and measuring the above-mentioned length, thickness, and amount by using calipers, an electronic scale, and a three-dimensional (3D) microscope or other microscope can be used. Moreover, an X-ray CT device may also be used to measure the length, thickness, and amount described above without breaking the catalyst. A suitable catalyst can be easily produced by applying each of the slurries described below under application conditions that confirm that the slurry is applied to the desired length, thickness, and amount.

Second Region

The second region is provided on the region containing palladium at the outflow side of exhaust gas. Preferably, the second region is provided on the region containing palladium, at a portion where the first region is not provided at the outflow side of exhaust gas. The second region need only contain at least neodymium. The neodymium can suppress rhodium migration and aggregation, and thus it is effective to include rhodium in the region where neodymium is contained. Preferably, as the amount of rhodium that is contained is increased, the amount of neodymium is also increased. The amount of neodymium is, in terms of $Nd_2O_3$, not less than 0.1 g/L, more preferably not less than 1 g/L, and even more preferably not less than 2 g/L relative to the three-dimensional structure. When the amount of neodymium is less than 0.1 g/L in a case where the amount of the refractory inorganic oxide is large, the effect of suppressing the migration of the precious metal will be reduced. Moreover, the amount of neodymium is, in terms of $Nd_2O_3$, not greater than 20 g/L, more preferably not greater than 10 g/L, even more preferably not greater than 9 g/L, and most preferably not greater than 7 g/L relative to the three-dimensional structure. When the amount of neodymium exceeds 20 g/L, the amount of neodymium becomes excessive relative to the amount of the precious metals contained in the second region, and the effect is not proportionate to the added amount of neodymium.

In addition to being used as an oxide, neodymium contained in the second region preferably forms a complex oxide with another metal. For example, a neodymium-containing complex oxide formed of neodymium and zirconium, aluminum, titanium, or the like can be used, and preferably, a neodymium-containing zirconium oxide formed of neodymium and zirconium is used. More preferably, at least one of a neodymium-containing zirconium oxide (1) having a high neodymium content and a neodymium-containing zirconium oxide (2) having a low neodymium content is used, and most preferably, both the neodymium-containing zirconium oxide (1) and the neodymium-containing zirconium oxide (2) are used. The amount of neodymium (in terms of $Nd_2O_3$) contained in the neodymium-containing complex oxide (1) having a high neodymium content is not less than 15 mass % and preferably not less than 20 mass % and is also not greater than 40 mass % and preferably not greater than 30 mass %. On the other hand, the amount of neodymium (in terms of $Nd_2O_3$) contained in the neodymium-containing complex oxide (2) having a low neodymium content is not less than 1 mass % and preferably not less than 3 mass % and is also not greater than 10 mass % and preferably not greater than 7 mass %.

The amount of all components provided in the second region is not less than 21 g/L, preferably not less than 30 g/L, more preferably not less than 50 g/L and is also not greater than 120 g/L, preferably less than 100 g/L, more preferably less than 90 g/L, and even more preferably less than 70 g/L relative to 1 liter (L) of the three-dimensional structure.

The length of the second region is preferably a length from the end of the outflow side of exhaust gas of the first region to the end of the outflow side of exhaust gas of the three-dimensional structure.

Examples of components other than neodymium contained in the second region include components that are ordinarily used in catalysts including alumina such as α-alumina, γ-alumina, and θ-alumina; silica, titania, zirconia, or mixtures thereof and refractory inorganic oxides such as complex oxides thereof; alkali metal oxides; alkaline earth metal oxides; rare earth metal oxides (excluding neodymium); and transition metal oxides. Among the above exemplary components, alumina or zirconia, which is a refractory inorganic oxide, oxygen storage substances (for example, cerium oxide) that can store oxygen, or lanthanum that can improve fire resistance is more preferable, and γ-alumina, θ-alumina, zirconia, and cerium oxide are even more preferable.

In particular, the amount of zirconium oxide used in the second region is not less than 1 g/L, more preferably not less than 3 g/L, and even more preferably not less than 4 g/L relative to the three-dimensional structure. When the amount of zirconium oxide is less than 1 g/L, the heat resistance of the second region is insufficient. In addition, the amount of zirconium oxide is not greater than 50 g/L, more preferably not greater than 30 g/L, and even more preferably not greater than 17 g/L relative to the three-dimensional structure. When the amount of zirconium oxide exceeds 50 g/L, the effect corresponding to the amount of zirconium oxide is reduced.

The second region may further contain a precious metal such as platinum, palladium, and rhodium. Platinum and rhodium are more preferable as the precious metal, and rhodium is even more preferable. The amount of platinum or palladium used in the second region may be substantially 0 g/L, which is an amount such that platinum or palladium does not produce an effect depending on the state of the exhaust gas, and the amount of platinum or palladium may be respectively, in terms of metal, greater than 0 g/L, preferably not less than 0.01 g/L, and more preferably not less than 0.02 g/L and is not greater than 12 g/L and more preferably not greater than 10 g/L relative to the three-dimensional structure depending on the state of the exhaust gas. The amount of rhodium that is used in the second region is, in terms of metal, not less than 0.01 g/L, more preferably not less than 0.02 g/L, and even more preferably not less than 0.04 g/L and is also not greater than 0.2 g/L, more preferably less than 0.1 g/L, and even more preferably not greater than 0.08 g/L relative to the three-dimensional structure.

The concentration of rhodium contained in the second region is not less than 0.01 mass % and preferably not less than 0.5 mass % and is also less than 0.2 mass % and preferably not greater than 0.15 mass %.

Moreover, the amount of palladium contained in the second region is not less than 0.01 g/L and preferably not less than 0.03 g/L and is also less than 0.1 g/L and preferably not greater than 0.08 g/L relative to the three-dimensional structure.

The concentration of palladium contained in the second region is not less than 0.01 mass % and preferably not less than 0.05 mass % and is also less than 0.2 mass % and preferably not greater than 0.15 mass %.

Neodymium Concentration Comparison Between Regions

With the exhaust gas purification catalyst according to an embodiment of the present invention, the concentration of neodymium contained in the first region and the second region is the same or higher than the concentration of neodymium contained in the region containing palladium. Furthermore, preferably, the concentration of neodymium contained in the first region and the second region is higher than the concentration of neodymium contained in the region containing palladium. The concentration of neodymium contained in each region refers to the percentage of the mass of neodymium (in terms of $Nd_2O_3$) relative to the total mass of neodymium (in terms of $Nd_2O_3$) and the components other than neodymium (mass of compounds contained in each region).

The concentration of neodymium contained in the first region is, in terms of $Nd_2O_3$, not less than 0.1 mass %, more preferably not less than 0.8 mass %, further preferably not less than 3 mass %, and most preferably not less than 5 mass % and is also not greater than 20 mass %, more preferably not greater than 17 mass %, even more preferably not greater than 15 mass %, and most preferably not greater than 10 mass %.

The concentration of neodymium contained in the second region is, in terms of $Nd_2O_3$, not less than 0.1 mass %, more preferably not less than 0.7 mass %, further preferably not less than 3 mass %, and most preferably not less than 5 mass % and is also not greater than 20 mass %, more preferably not greater than 17 mass %, even more preferably not greater than 15 mass %, and most preferably not greater than 10 mass %. When the concentration of neodymium contained in the second region exceeds 20 mass %, the effect of suppressing the migration of rhodium in accordance with the concentration thereof cannot be obtained.

Neodymium can suppress rhodium migration and aggregation. Therefore, it is preferable to include a large amount of neodymium in a region containing a large amount of rhodium or having a high rhodium concentration within the above-described concentration range of neodymium contained in the first region and the second region. More preferably, a large amount of neodymium is contained in a region with a large amount of rhodium and a high concentration of rhodium within the above-described concentration range of neodymium contained in the first region and the second region.

Rhodium Concentration Comparison Between Regions

With the exhaust gas purification catalyst according to an embodiment of the present invention, the concentration of rhodium contained in the first region is preferably higher than the concentration of rhodium contained in the second region. The concentration of rhodium contained in each region refers to the percentage of the mass of rhodium (in terms of metal) relative to the total mass of the rhodium and the components other than rhodium in each region. When the concentration of rhodium contained in the first region is lower than the concentration of rhodium contained in the second region, the light-off characteristics of the catalyst at low temperatures diminish. Note that the light-off characteristics are characteristics expressed by the time (light-off time) at which the purification rate of the catalyst with regard to HC, CO, and NOx reaches 50% (T50) with respect to exhaust gas at a specific temperature.

Comparison of Amounts of all Provided Components Between Regions

The amount of all components provided in each region is not particularly limited as long as the amount improves catalytic activity. (1) Preferably, the amount of all components in the region containing palladium is the same or larger than the amount of all components in either the second region or the first region, and (2) more preferably, the amount of all components in the region containing palladium is larger than the amount of all components either the second region or the first region. Note that the amount of all components provided in each region can be appropriately selected from the amount of each component provided in each of the regions described above.

Method for Preparing the Exhaust Gas Purification Catalyst

The method for preparing an exhaust gas purification catalyst according to an embodiment of the present invention is not particularly limited as long as it is a known preparation method used to prepare an exhaust gas purification catalyst, but an example of a more preferable preparation method will be described in detail below.

Examples of the method for preparing the exhaust gas purification catalyst include (1) a method in which a slurry a for forming a region containing palladium, a slurry b for forming a first region, and a slurry c for forming a second region are prepared, the slurry a is brought into contact with a three-dimensional structure, after which the excess slurry is removed and the three-dimensional structure is dried or calcined, subsequently the slurry b is brought into contact with a portion that becomes the first region on the region containing palladium, after which the excess slurry is removed and the three-dimensional structure is dried or calcined, subsequently the slurry c is brought into contact with a portion that becomes the second region on the region containing the palladium, after which the excess slurry is removed and the three-dimensional structure is dried or calcined, and thereby a catalyst is obtained; (2) a method in which slurries a, b and c are prepared in the same manner as in (1) above, after the region containing palladium is formed, the slurry c is brought into contact with a portion that becomes the second region on the region containing palladium, after which the excess slurry is removed and the three-dimensional structure is dried or calcined, and subsequently the slurry b is brought into contact with a portion that becomes the first region on the region containing palladium, after which the excess slurry is removed and the three-dimensional structure is dried or calcined to obtain a catalyst; and (3) a method in which a slurry d containing a component specific to the region containing palladium, a slurry e containing a component specific to the first region, a slurry f containing a component specific to the second region, and a solution containing a component common to each of the regions are prepared, the slurry d is brought into contact with a three-dimensional structure, after which the excess slurry is removed and the three-dimensional structure is dried or calcined, subsequently the slurry e is brought into contact with the portion that becomes the first region, after which the excess slurry is removed and the three-dimensional structure is dried or calcined, subsequently the slurry f is brought into contact with the portion that becomes the second region, after which the excess slurry is removed and the three-dimensional structure is dried or calcined, and finally, the three-dimensional structure after calcination is impregnated with the solution and then is dried or calcined to thereby obtain a catalyst.

The drying temperature is preferably from room temperature to approximately 150° C., and the calcination temperature is preferably from approximately 150 to 600° C. The drying and calcination conditions can be changed as appropriate in accordance with the target object.

Examples of methods for producing the slurries a to f include (1) a method in which powders of each component are wet milled to form a slurry; (2) a method in which the powder of a certain component is impregnated with a liquid (precursor) of another component and then dried or calcined to obtain a mixed powder and the mixed powder is then wet milled to form a slurry; and (3) a method in which a liquid (precursor) of another component is mixed into a powder of a certain component and the mixture was then wet milled to form a slurry. Alternatively, when the powder is a fine powder, a slurry can be produced by mixing the fine powder with an appropriate medium.

Exhaust Gas Purification Method

The exhaust gas to be subjected to (to be applied) the exhaust gas purification method according to an embodiment of the present invention is not particularly limited as long as it is an exhaust gas discharged from an internal combustion engine such as a gasoline engine, a diesel engine, or a gas turbine, but exhaust gas discharged from a gasoline engine is more preferable. Bringing the exhaust gas purification catalyst according to an embodiment of the present invention into contact with exhaust gas discharged from an internal combustion engine can purify the hydrocarbons (HC), carbon monoxide (CO), and nitrogen oxides (NOx) in the exhaust gas. In particular, while the exhaust gas purification catalyst according to an embodiment of the present invention is capable of more effectively purifying the exhaust gas when the temperature of the exhaust gas is higher than 500° C., even though the exhaust gas is preferably not greater than 500° C., more preferably not greater than 400° C., and even more preferably not greater than 350° C., the purification rate of the exhaust gas can reach not less than 50%. Here, when the temperature at which the purification rate of exhaust gas reaches 50% is considered to be T50, a lower temperature at which T50 is reached means that the exhaust gas is purified more rapidly.

In addition, the exhaust gas purification catalyst according to an embodiment of the present invention can effectively purify exhaust gas even when the space velocity of the exhaust gas is preferably not less than 80000 $h^{-1}$, more preferably not less than 100000 $h^{-1}$, and even more preferably not less than 120000 $h^{-1}$. The upper limit of the space velocity of exhaust gas depends on the displacement of the engine or other internal combustion engine, but an upper limit of not greater than 500000 $h^{-1}$ is preferable.

Furthermore, even when exposed to exhaust gas at temperatures from 800 to 1000° C. for 40 to 450 hours, the exhaust gas purification catalyst is effective and can purify HC, CO, and NOx in the exhaust gas, and therefore the exhaust gas purification catalyst can purify NOx for a long period of time and has durability.

Use of the exhaust gas purification catalyst according to the embodiment of the present invention described above allows the exhaust gas to be efficiently purified even when the temperature of the exhaust gas is low and when the space velocity is high. Here, "low temperature" indicates that the temperature of the exhaust gas at the end portion of the side of the three-dimensional structure where the exhaust gas inflows is from 100° C. to 400° C., and "space velocity is high" refers to a velocity of not less than 80000 $h^{-1}$.

SUMMARY

As described above, the present invention includes the inventions described in (1) to (16) below.

(1) An exhaust gas purification catalyst including: a region containing palladium, the region being provided on a three-dimensional structure; and a first region and a second region being provided on the region containing palladium in order from an inflow side of exhaust gas to an outflow side of exhaust gas, wherein the concentration of neodymium contained in the first region is the same or higher than the concentration of neodymium contained in the second region.

(2) The exhaust gas purification catalyst according to (1), wherein the concentration of neodymium contained in either the first region and/or the second region is the same or higher than a concentration of neodymium contained in the region containing palladium.

(3) The exhaust gas purification catalyst according to (1) or (2), wherein the concentration of neodymium contained in either the first region and/or the second region is from 0.8 mass % to 17 mass % in terms of $Nd_2O_3$.

(4) The exhaust gas purification catalyst according to any one of (1) to (3), wherein the first region and the second region contain a neodymium-containing complex oxide.

(5) The exhaust gas purification catalyst according to any one of (1) to (4), wherein the first region and the second region contain a neodymium-containing zirconium oxide.

(6) The exhaust gas purification catalyst according to any one of (1) to (5), wherein multiple neodymium-containing zirconium oxides having a different neodymium content are used as the neodymium-containing zirconium oxide contained in the first region and/or the second region.

(7) The exhaust gas purification catalyst according to any one of (1) to (6), wherein as the neodymium-containing zirconium oxide, at least one of: a neodymium-containing zirconium oxide (1) having a content of neodymium in terms of $Nd_2O_3$ of from 15 mass % to 40 mass % and a neodymium-containing zirconium oxide (2) having a content of neodymium in terms of $Nd_2O_3$ of from 1 mass % to 10 mass % is used.

(8) The exhaust gas purification catalyst according to any one of (1) to (7), wherein the concentration of rhodium contained in the first region is higher than the concentration of rhodium contained in the second region.

(9) The exhaust gas purification catalyst according to any one of (1) to (8), wherein the concentration of palladium contained in the region containing palladium is from 1 mass % to 10 mass %; the concentration of rhodium contained in the first region is from 2 mass % to 5 mass %; and the concentration of rhodium contained in the second region is not less than 0.01 mass % and less than 2 mass %.

(10) The exhaust gas purification catalyst according to any one of (1) to (9), wherein the first region and/or the second region contains palladium.

(11) The exhaust gas purification catalyst according to any one of (1) to (10), wherein the concentration of palladium contained in the first region is from 0.2 mass % to 0.5 mass %, and the concentration of palladium contained in the second region is not less than 0.01 mass % and less than 0.2 mass %.

(12) The exhaust gas purification catalyst according to any one of (1) to (11), wherein the amount of all components provided in each region is: from 90 g/L to 220 g/L in the region containing palladium; not less than 21 g/L and less than 90 g/L in the first region; and not less than 21 g/L and less than 90 g/L in the second region relative to 1 liter of the three-dimensional structure.

(13) The exhaust gas purification catalyst according to any one of (1) to (12), wherein the three-dimensional structure is from 30 mm to 200 mm, the region containing palladium is from 60% to 100% relative to a length of the three-dimensional structure, the first region is from 20 mm to 50 mm, and the second region is provided on the region containing palladium, at a portion where the first region is not provided at the outflow side of exhaust gas.

(14) A method for purifying exhaust gas, comprising purifying exhaust gas using the exhaust gas purification catalyst described in any one of (1) to (13).

(15) The method for purifying exhaust gas according to (14), wherein exhaust gas having a temperature of from 100° C. to 500° C. is purified.

(16) The method for purifying exhaust gas according to (14) or (15), wherein exhaust gas having a space velocity of not less than 80000 $h^{-1}$ is purified.

EXAMPLES

The present invention will be described in further detail hereinafter using examples and comparative examples, but the present invention should not be construed as being limited to these examples.

Example 1

Region Containing Palladium

An aqueous solution containing palladium was mixed with a barium compound and an oxide containing zirconium (also containing cerium and lanthanum), and the mixture was then dried and calcined to obtain a powder. This powder and an oxide containing aluminum (containing 97 mass % of aluminum in terms of $Al_2O_3$ and also containing lanthanum) were mixed, water was further added, and the mixture was wet milled to obtain a slurry for forming a region containing palladium. Next, a honeycomb (three-dimensional structure) made of cordierite with a length of 100 mm was immersed in the slurry, after which the excess slurry was removed, the honeycomb was dried and calcined, and thereby a region containing palladium was provided on the honeycomb. Per liter of honeycomb, the amount of palladium was 3 g, the amount of zirconium in terms of zirconium oxide ($ZrO_2$) was 20 g, the amount of aluminum in terms of aluminum oxide ($Al_2O_3$) was 50 g, the amount of lanthanum in terms of $La_2O_3$ was 11 g, the amount of barium in terms of BaO was 12 g, and the amount of cerium in terms of cerium oxide ($CeO_2$) was 21 g. The concentration of palladium contained in the region was 2.6 mass %. The region did not include neodymium. A total amount of 117 g of components per liter of the three-dimensional structure was provided in the region.

First Region

Next, an aqueous solution containing palladium and rhodium was mixed with a compound containing lanthanum, an oxide containing neodymium (neodymium content of 27 mass % in terms of $Nd_2O_3$ and containing zirconium), an oxide containing neodymium (neodymium content of 5 mass % in terms of $Nd_2O_3$ and containing zirconium and cerium) and an oxide containing aluminum (containing 97 mass % of aluminum in terms of $Al_2O_3$), and the mixture was then dried and calcined to obtain a powder. Water was then added to this powder, and the mixture was wet milled to obtain a slurry for forming the first region. Next, the honeycomb provided with the region containing palladium was immersed in the slurry for forming the first region from one end thereof to a predetermined position (the position that becomes a boundary with the second region), then the excess slurry was removed, the honeycomb was dried and calcined, and thereby a first region was provided on the region containing palladium, from the exhaust gas inlet side of the honeycomb to a length of 50 mm. Per liter of honeycomb, the amount of palladium was 0.17 g, the amount of rhodium was 0.14 g, the amount of neodymium in terms of neodymium oxide ($Nd_2O_3$) was 5 g, the amount of zirconium in terms of zirconium oxide ($ZrO_2$) was 29 g, the amount of aluminum in terms of aluminum oxide ($Al_2O_3$) was 13 g, and the amount of cerium in terms of cerium oxide ($CeO_2$) was 6 g. The concentration of neodymium (in terms of $Nd_2O_3$) in the first region was 9.4 mass %. The concentration of rhodium in the region was 0.3 mass %, and the concentration of palladium was 0.3 mass %. A total amount of 53.31 g of components per liter of the three-dimensional structure was provided in the region.

Second Region

Next, an aqueous solution containing palladium and rhodium was mixed with a compound containing lanthanum, an oxide containing neodymium (neodymium content of 27 mass % in terms of $Nd_2O_3$ and containing zirconium), an oxide containing neodymium (neodymium content of 5 mass % in terms of $Nd_2O_3$ and containing zirconium and cerium) and an oxide containing aluminum (containing 97 mass % of aluminum in terms of $Al_2O_3$), and the mixture was then dried and calcined to obtain a powder. Water was then added to this powder, and the mixture was wet milled to obtain a slurry for forming the second region. Next, the honeycomb provided with the first region was immersed in the slurry for forming the second region from the other end to a predetermined position (the position that becomes a boundary with the first region), then the excess slurry was removed, the honeycomb was dried and calcined, and thereby a second region was provided on the region containing palladium, from the exhaust gas outlet side to a length of 50 mm. Per liter of honeycomb, the amount of palladium was 0.06 g, the amount of rhodium was 0.05 g, the amount of neodymium in terms of neodymium oxide ($Nd_2O_3$) was 5 g, the amount of zirconium in terms of zirconium oxide ($ZrO_2$) was 29 g, the amount of aluminum in terms of aluminum oxide ($Al_2O_3$) was 13 g, and the amount of cerium in terms of cerium oxide ($CeO_2$) was 6 g. The concentration of neodymium (in terms of $Nd_2O_3$) in the region was 9.4 mass %. The concentration of rhodium in the region was 0.1 mass %, and the concentration of palladium was 0.1 mass %. A total amount of 53.11 g of components per liter of the three-dimensional structure was provided in the region.

Through this, an exhaust gas purification catalyst A was prepared. The schematic configuration of the exhaust gas purification catalyst A is illustrated in FIG. 1.

As illustrated in FIG. 1, the exhaust gas purification catalyst A of the present example has a structure in which a region 2 containing palladium is provided on a honeycomb 1 made of cordierite and in which a first region 3 and a second region 4 are provided on the region 2 containing palladium in order from an inflow side of exhaust gas to an outflow side.

Comparative Example 1

Region Containing Palladium

An aqueous solution containing palladium was mixed with lanthanum oxide, barium oxide, an oxide containing aluminum, and an oxide containing cerium (containing zirconium), and the mixture was then dried and calcined to obtain a powder. Water was then added to this powder, and the mixture was wet milled to obtain a slurry for forming a region containing palladium. Next, a honeycomb made of cordierite with a length of 80 mm was immersed in the slurry, after which the excess slurry was removed, the honeycomb was dried and calcined, and thereby a region containing palladium was provided on the honeycomb. Per liter of the honeycomb, the amount of palladium was 5 g, the amount of zirconium in terms of zirconium oxide ($ZrO_2$) was 20 g, the amount of aluminum in terms of aluminum oxide ($Al_2O_3$) was 58 g, the amount of cerium in terms of cerium oxide ($CeO_2$) was 20 g, the amount of barium in terms of BaO was 12 g, and the amount of lanthanum in terms of $La_2O_3$ was 10 g. A total amount of 125 g of components per liter of the three-dimensional structure was provided in the region.

Surface Region

Next, an aqueous solution containing rhodium was mixed with an oxide containing aluminum, and an oxide containing cerium (containing zirconium and lanthanum), and the mixture was then dried and calcined to obtain a powder. Water was then added to this powder, and the mixture was wet milled to obtain a slurry for forming a surface region. Next, the honeycomb provided with the region containing palladium was immersed in the slurry for forming the surface region, then the excess slurry was removed, the honeycomb was dried and calcined, and thereby a surface region was provided on the region containing palladium. Per liter of honeycomb, the amount of rhodium was 0.6 g, the amount of zirconium in terms of zirconium oxide ($ZrO_2$) was 21 g, the amount of lanthanum in terms of $La_2O_3$ was 9 g, the amount of aluminum in terms of aluminum oxide ($Al_2O_3$) was 37 g, and the amount of cerium in terms of cerium oxide ($CeO_2$) was 8 g. A total amount of 75.6 g of components per liter of the three-dimensional structure was provided in the region.

Through this, an exhaust gas purification catalyst B was prepared for comparison. The schematic configuration of the exhaust gas purification catalyst B is illustrated in FIG. 2.

Figure 2:
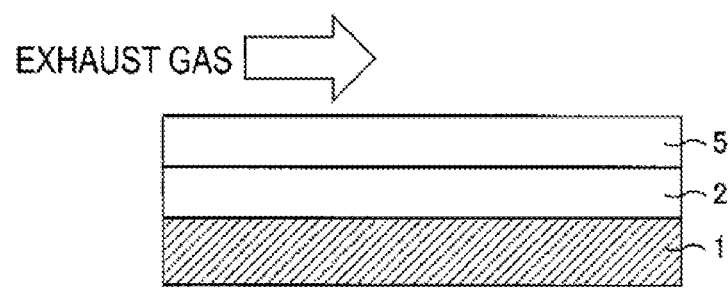
FIG. 2 is a cross section view illustrating a schematic configuration of a known exhaust gas purification catalyst (Comparative Example 1).

As illustrated in FIG. 2, the exhaust gas purification catalyst B of the comparative example had a structure in which the region 2 containing palladium was provided on the honeycomb 1 made of cordierite, and a surface region 5 was provided on the region 2 containing palladium.

Catalyst Evaluation

The exhaust gas purification catalysts A and B prepared in Example 1 and Comparative Example 1 were separately installed in an exhaust pipe of a gasoline engine for which an air/fuel (A/F) oscillation control according to the stoichiometric ratio A/F was performed. Furthermore, the exhaust gas purification catalysts A and B were exposed to exhaust gas having a temperature of 1000° C. for 80 hours, after which exhaust gas having a temperature of 100° C. was passed there through, and after the catalyst was maintained sufficiently at 100° C., the exhaust gas temperature was increased at a constant rate. Note that catalysts having different catalyst lengths were used, and thus the catalysts to be evaluated were evaluated with the amount of exhaust gas being controlled so that the space velocities were the same. The exhaust gas was passed through at a space velocity of 125000 $h^{-1}$ with respect to the catalyst, and the temperatures (T50) at which the conversion rates of HC, CO, and NOx reached 50% were measured. The results are shown in Table 1.

TABLE 1

| | T50 | | |
| --- | --- | --- | --- |
| | CO (° C.) | THC (° C.) | NOx (° C.) |
| EXAMPLE 1 | 345 | 345 | 344 |
| COMPARATIVE EXAMPLE 1 | 392 | 389 | 369 |

As is clear from Table 1, in comparison to the catalyst (Comparative Example 1) for which the surface region had a single composition, which is widely found in prior art, the exhaust gas purification catalyst according to an embodiment of the present invention exhibited a purification rate that reached 50% at a lower temperature with respect to all of HC (described as THC (total hydrocarbons) in Table 1), CO, and NOx and demonstrated superior performance.

INDUSTRIAL APPLICABILITY

The exhaust gas purification catalyst and the exhaust gas purification method using the catalyst according to the present invention can be suitably used in the purification of exhaust gas discharged from an internal combustion engine such as a gasoline engine, a diesel engine, and a gas turbine.

REFERENCE SIGNS LIST

1 Honeycomb (three-dimensional structure)
2 Region containing palladium
3 First region
4 Second region
5 Surface region

The invention claimed is:

1. An exhaust gas purification catalyst comprising:
a region containing palladium, the region being provided on a three-dimensional structure; and
a first region and a second region being provided on the region containing palladium in order from an inflow side of exhaust gas to an outflow side of exhaust gas; wherein
the first region and the second region comprise neodymium;
the concentration of neodymium contained in the first region is the same or higher than the concentration of neodymium contained in the second region; and
the first region further comprises platinum or palladium, and the amount of platinum or palladium in the first region is 0.01 g/L or more.

2. The exhaust gas purification catalyst according to claim 1, wherein the concentration of neodymium contained in either the first region and/or the second region is the same or higher than a concentration of neodymium contained in the region containing palladium.

3. The exhaust gas purification catalyst according to claim 1, wherein the concentration of neodymium contained in either the first region and/or the second region is from 0.8 mass % to 17 mass % in terms of $Nd_2O_3$.

4. The exhaust gas purification catalyst according to claim 1, wherein the first region and the second region contain a neodymium-containing complex oxide.

5. The exhaust gas purification catalyst according to claim 1, wherein the first region and the second region contain a neodymium-containing zirconium oxide.

6. The exhaust gas purification catalyst according to claim 5, wherein multiple neodymium-containing zirconium oxides having a different neodymium content are used as the neodymium-containing zirconium oxide contained in the first region and/or the second region.

7. The exhaust gas purification catalyst according to claim 6, wherein as the neodymium-containing zirconium oxide, at least one of:

a neodymium-containing zirconium oxide (1) having a content of neodymium in terms of $Nd_2O_3$ of from 15 mass % to 40 mass % and
a neodymium-containing zirconium oxide (2) having a content of neodymium in terms of $Nd_2O_3$ of from 1 mass % to 10 mass % is used.

8. The exhaust gas purification catalyst according to claim 1, wherein the first region and the second region further comprise rhodium, and the concentration of rhodium contained in the first region is higher than a concentration of rhodium contained in the second region.

9. The exhaust gas purification catalyst according to claim 1, wherein the first region and the second region further comprise rhodium, and the concentration of palladium contained in the region containing palladium is from 1 mass % to 10 mass %;
the concentration of rhodium contained in the first region is from 0.2 mass % to 0.5 mass %; and
the concentration of rhodium contained in the second region is not less than 0.01 mass % and less than 0.2 mass %.

10. The exhaust gas purification catalyst according to claim 1, wherein the first region and/or the second region contain palladium.

11. The exhaust gas purification catalyst according to claim 1, wherein the concentration of palladium contained in the first region is from 0.2 mass % to 0.5 mass %, and
the concentration of palladium contained in the second region is not less than 0.01 mass % and less than 0.2 mass %.

12. The exhaust gas purification catalyst according to claim 1, wherein the amount of all components provided in each region is:
from 90 g/L to 220 g/L in the region containing palladium;
not less than 21 g/L and less than 90 g/L in the first region; and
not less than 21 g/L and less than 90 g/L in the second region relative to 1 liter of the three-dimensional structure.

13. The exhaust gas purification catalyst according to claim 1, wherein the three-dimensional structure is from 30 mm to 200 mm, the region containing palladium is from 60% to 100% relative to a length of the three-dimensional structure, the first region is from 20 mm to 50 mm, and the second region is provided on the region containing palladium, at a portion where the first region is not provided at the outflow side of exhaust gas.

14. The exhaust gas purification catalyst according to claim 1, wherein the second region further comprises platinum or palladium, and the amount of platinum or palladium in the second region is 0.01 g/L or more.

15. A method for purifying exhaust gas, comprising purifying exhaust gas using the exhaust gas purification catalyst according to claim 1.

16. The method for purifying exhaust gas according to claim 15, wherein exhaust gas having a temperature of from 100° C. to 500° C. is purified.

17. The method for purifying exhaust gas according to claim 15, wherein exhaust gas having a space velocity of not less than 80000 $h^{-1}$ is purified.

* * * * *